United States Patent
Tanaka et al.

(10) Patent No.: US 6,288,711 B1
(45) Date of Patent: Sep. 11, 2001

(54) COORDINATE INPUT APPARATUS, METHOD OF CONTROLLING SAME AND COMPUTER-READABLE MEMORY

(75) Inventors: Atsushi Tanaka, Yamato; Yuichiro Yoshimura, Kamakura; Ryozo Yanagisawa, Inzai; Katsuyuki Kobayashi; Hajime Sato, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/257,033

(22) Filed: Feb. 25, 1999

(30) Foreign Application Priority Data

Mar. 3, 1998  (JP) .................................... 10-050648

(51) Int. Cl.$^7$ ...................................................... G09G 5/00
(52) U.S. Cl. ........................... 345/179; 345/156; 345/180; 178/18.01; 178/18.04; 178/19.02; 178/19.04
(58) Field of Search ..................... 345/156, 179, 345/180; 178/18.01, 18.04, 19.02, 19.04

(56) References Cited

U.S. PATENT DOCUMENTS

| | | | |
|---|---|---|---|
| 5,352,856 | 10/1994 | Tanaka et al. | 178/18 |
| 5,362,930 | 11/1994 | Yoshimura et al. | 178/18 |
| 5,420,804 * | 5/1995 | Tanaka et al. | 364/571.01 |
| 5,491,305 * | 2/1996 | Kawakami et al. | 178/19 |
| 5,500,492 * | 3/1996 | Kobayashi et al. | 178/18 |
| 5,539,160 | 7/1996 | Tokioka et al. | 128/19 |
| 5,565,893 * | 10/1996 | Sato et al. | 345/177 |
| 5,691,959 * | 11/1997 | Kriewall et al. | 367/129 |
| 5,736,979 * | 4/1998 | Kobayashi et al. | 345/177 |
| 5,748,182 * | 5/1998 | Ohashi et al. | 345/173 |
| 5,760,346 | 6/1998 | Kabayashi et al. | 178/18 |
| 5,761,087 | 6/1998 | Yoshimura et al. | 364/508 |
| 5,862,049 | 1/1999 | Sato et al. | 364/190 |

FOREIGN PATENT DOCUMENTS

| | | |
|---|---|---|
| 5-62771 | 9/1993 | (JP) . |
| 6-48456 | 6/1994 | (JP) . |

* cited by examiner

Primary Examiner—Bipin Shalwala
Assistant Examiner—Vincent E. Kovalick
(74) Attorney, Agent, or Firm—Fitzpatrick, Cella, Harper & Scinto

(57) ABSTRACT

Vibration is sensed as a signal by a vibration sensor and the signal level of the sensed signal is measured by an A/D converter. The distance between a position entered by a vibrating input pen and the vibration sensor is calculated and, on the basis of the calculated distance, input level information is obtained from the measured signal level by an arithmetic and control unit.

11 Claims, 6 Drawing Sheets

COORDINATE INPUT APPARATUS, METHOD OF CONTROLLING SAME AND COMPUTER-READABLE MEMORY

BACKGROUND OF THE INVENTION

This invention relates to a coordinate input apparatus for calculating a position, which has been designated by a vibrating input pen, based upon vibration that has been input to a vibration transfer plate by the vibrating input pen. The invention relates further to a method of controlling this coordinate input apparatus and to a computer-readable memory for such control.

Tablets for inputting coordinates by a stylus pen (input pen) and digitizers have become widely available as coordinate input devices. Coordinate input by means of an input pen serves as an excellent human interface that approximates the pen-and-paper manner of input with which the user is well accustomed.

The input pen used with such a tablet or digitizer has a pen pressure sensing function in order to better mimic a writing instrument. More specifically, a pressure sensing mechanism is provided inside the input pen and information indicative of the pen pressure sensed is output to a host computer along with coordinate information indicating the position input by the pen. On the basis of the coordinate information and pen pressure information, the host computer alters the writing thickness or density of an entered line to provide a sensation nearer to that of existing writing instruments.

By way of example, a coordinate input apparatus disclosed in the specification of Japanese Patent Publication (KOKOKU) No. 5-62771 utilizing ultra sonic wave to sense input coordinates calculates the position of input coordinates by sensing a delay in the time of waves that propagate along a tablet, which is the input surface. Since the tablet used in this coordinate input apparatus does not employ any highly intricate means such as matrix wiring, the apparatus can be provided at low cost. Moreover, if transparent plate glass is used as the tablet, a coordinate input apparatus having a higher degree of transparency than other such apparatus using different techniques can be constructed. Further, as set forth in the specification of Japanese Patent Publication (KOKOKU) No. 6-48456, there is known an arrangement in which the sensing precision of the apparatus is improved by calculating pen pressure based upon the magnitude of propagating vibration (the amplitude of the signal sensed).

In the conventional coordinate input apparatus, however, the sensing effectiveness of the apparatus is judged upon calculating pen pressure based upon the sum of signal amplitudes sensed by sensors. In order to utilize this pen pressure information as the actual pen pressure information indicative of the input pen, therefore, more detailed pen pressure information is required. In other words, if pen pressure information is obtained as the sum of the amplitudes of sensed signals, the amount of change in pen pressure signal level differs depending upon the location at which the input is made (in a case where distances from the sensors differ) and, hence, accurate pen pressure cannot be calculated.

SUMMARY OF THE INVENTION

Accordingly, an object of the present invention is to provide a coordinate input apparatus for calculating an input position of a vibrating input pen based upon vibration that has been input by the vibrating input pen, wherein pen pressure of the vibrating input pen can be sensed more precisely, as well as a method of controlling this coordinate input apparatus and a computer-readable memory for such control.

According to the present invention, the foregoing object is attained by providing a coordinate input apparatus for calculating a position, which has been designated by a vibrating input pen, based upon vibration that has been input to a vibration transfer plate by the vibrating input pen, comprising: sensing means for sensing the vibration as a signal; measurement means for measuring signal level of the signal sensed by the sensing means; and calculation means for calculating distance between the sensing means and a position input by the vibrating input pen and calculating, on the basis of the distance calculated, input-level information from the signal level measured by the measurement means.

Further, according to the present invention, the foregoing object is attained by providing a method of controlling a coordinate input apparatus for calculating a position, which has been designated by a vibrating input pen, based upon vibration that has been input to the vibration transfer plate by the vibrating input pen, comprising: a sensing step of sensing the vibration as a signal by a sensing unit; a measurement step of measuring signal level of the signal sensed at the sensing step; and a calculation step of calculating distance between the sensing unit and a position input by the vibrating input pen and calculating, on the basis of the distance calculated, input-level information from the signal level measured at the measurement step.

Further, according to the present invention, the foregoing object is attained by providing a computer-readable memory storing program code which controls a coordinate input apparatus for calculating a position, which has been designated by a vibrating input pen, based upon vibration that has been input to a vibration transfer plate by the vibrating input pen, the program code comprising: program code of a sensing step of sensing the vibration as a signal by a sensing unit; program code of a measurement step of measuring signal level of the signal sensed at the sensing step; and program code of a calculation step of calculating distance between the sensing unit and a position input by the vibrating input pen and calculating, on the basis of the distance calculated, input-level information from the signal level measured at the measurement step.

In accordance with the present invention described above, it is possible to provide a coordinate input apparatus for calculating the input position of a vibrating input pen based upon vibration that has been input by the vibrating input pen, wherein the pen pressure of the vibrating input pen can be sensed more precisely, as well as a method of controlling this coordinate input apparatus and a computer-readable memory for such control.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the drawings.

First Embodiment

Figure 2:
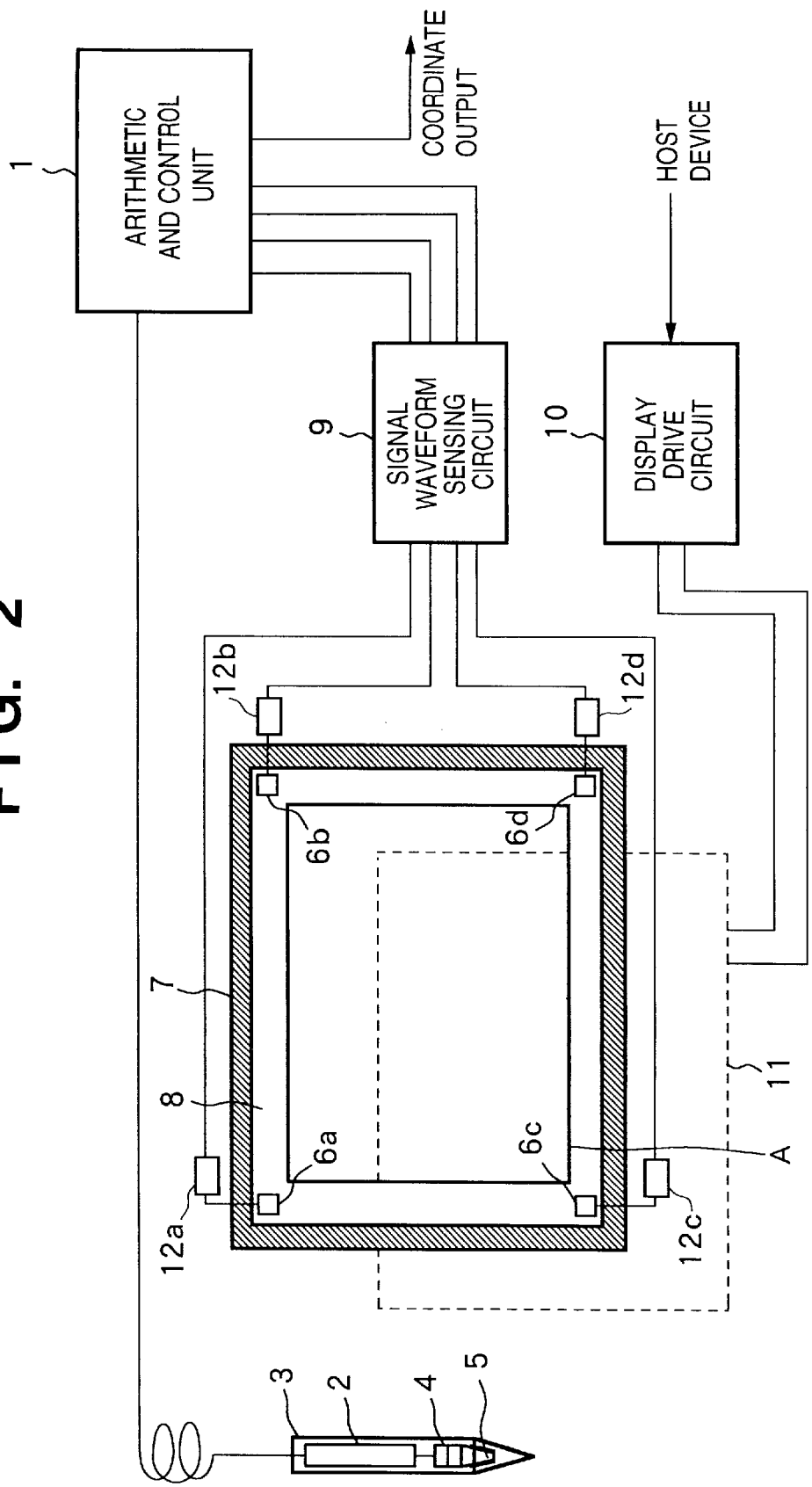
FIG. 2 is a diagram showing the construction of a coordinate input apparatus according to a first embodiment of the present invention.

FIG. 2 is a diagram showing the construction of a coordinate input apparatus according to a first embodiment of the present invention.

As shown in FIG. 2, the apparatus includes an arithmetic and control unit 1 for controlling the overall apparatus and calculating coordinate positions, and an oscillator drive circuit 2, which is incorporated within a vibrating input pen 3, for driving a vibrator (a piezoelectric element such as a PZT) 4 within the vibrating input pen 3. Vibration produced by the vibrator 4 passes through a horn and causes a pen tip 5 to vibrate. The apparatus further includes a vibration transfer plate 8 comprising a transparent member such as plate glass. A coordinate input by the vibrating input pen 3 is performed by touching a coordinate input area (the area, which will be referred to as an "effective area" below, indicated by the solid line and designated by character A in FIG. 2) on the vibration transfer plate 8. Provided along the perimeter of the vibration transfer plate 8 is a vibration absorber 7 for preventing or reducing the return of unwanted vibration to the center of the vibration transfer plate 8. Such unwanted vibration is the result of vibration, which has been input by the vibrating input pen 3, being reflected at the edges of the vibration transfer plate 8. Vibration sensors 6a to 6d for converting mechanical vibration of a piezoelectric element or the like to electric signals are secured to the vibration transfer plate 8 near the boundary of the vibration absorber 7.

Vibration sensed by the vibration sensors 6a to 6d is amplified by preamplifiers 12a to 12d, respectively, and is then input to a signal waveform sensing circuit 9. The latter executes signal processing and outputs the result of signal processing to the arithmetic and control unit 1 so that coordinates may be calculated. The details of the signal waveform sensing circuit 9 will be described later. The apparatus further includes a display 11, such as a liquid crystal display panel, disposed in back of the vibration transfer plate 8. A position traced by the vibrating input pen 3 is output to a host device such as a personal computer by the arithmetic and control unit 1. On the basis of coordinates indicated by this position, the host device drives a display drive circuit 10 to make possible a display, which is stipulated by the vibrating input pen 3, just as if writing were being performed on paper by a writing instrument.

The oscillation frequency of the vibrator 4 is selected to have a value capable of producing lamb waves in the vibration transfer plate 8. An elastic wave that propagates through the vibration transfer plate 8 is a lamb wave and is advantageous in that it is less susceptible than a surface wave to the effects of scratches on the surface of the vibration transfer plate 8 and obstacles placed on the surface.

The arithmetic and control unit 1 repeats the coordinate acquisition operation at predetermined intervals (e.g., every 10 ms) and outputs coordinate information and pen pressure information obtained by the vibrating input pen 3. The coordinate acquisition operation includes successively selecting the vibration sensors 6a to 6d and sensing time delay in regard to arrival of elastic waves at each of these sensors. Arrival delay times of two types, namely a group delay time tg based upon group velocity of lamb waves and a phase delay time tp based upon phase velocity. Distance between the vibrating input pen 3 and each of the vibration sensors 6a to 6d is calculated on the basis of these two delay times. The vibrating input pen 3, which is connected via a cord, is subjected to various types of control, such as control of the power supplied thereto.

The process through which vibration transfer time is sensed and the details of construction of the signal waveform sensing circuit 9 will be described with reference to FIGS. 3 and 4.

The description that follows deals with the vibration sensor 6a. Since the vibration sensors 6b, 6c and 6d are the same as the vibration sensor 6a, these need not be described in detail.

Figure 3:
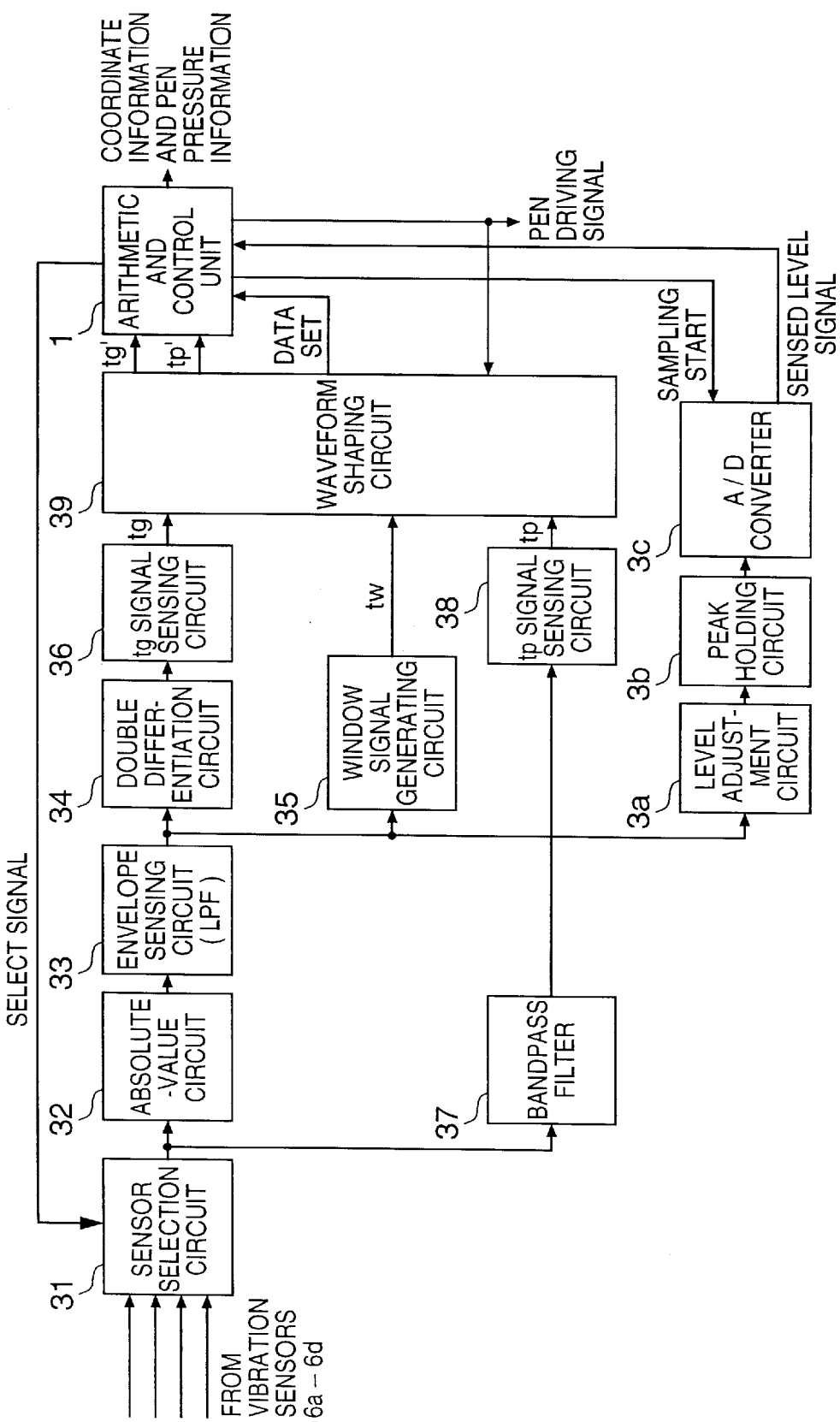
FIG. 3 is a block diagram showing the details of construction of a signal waveform sensing circuit according to the first embodiment.
Figure 4:
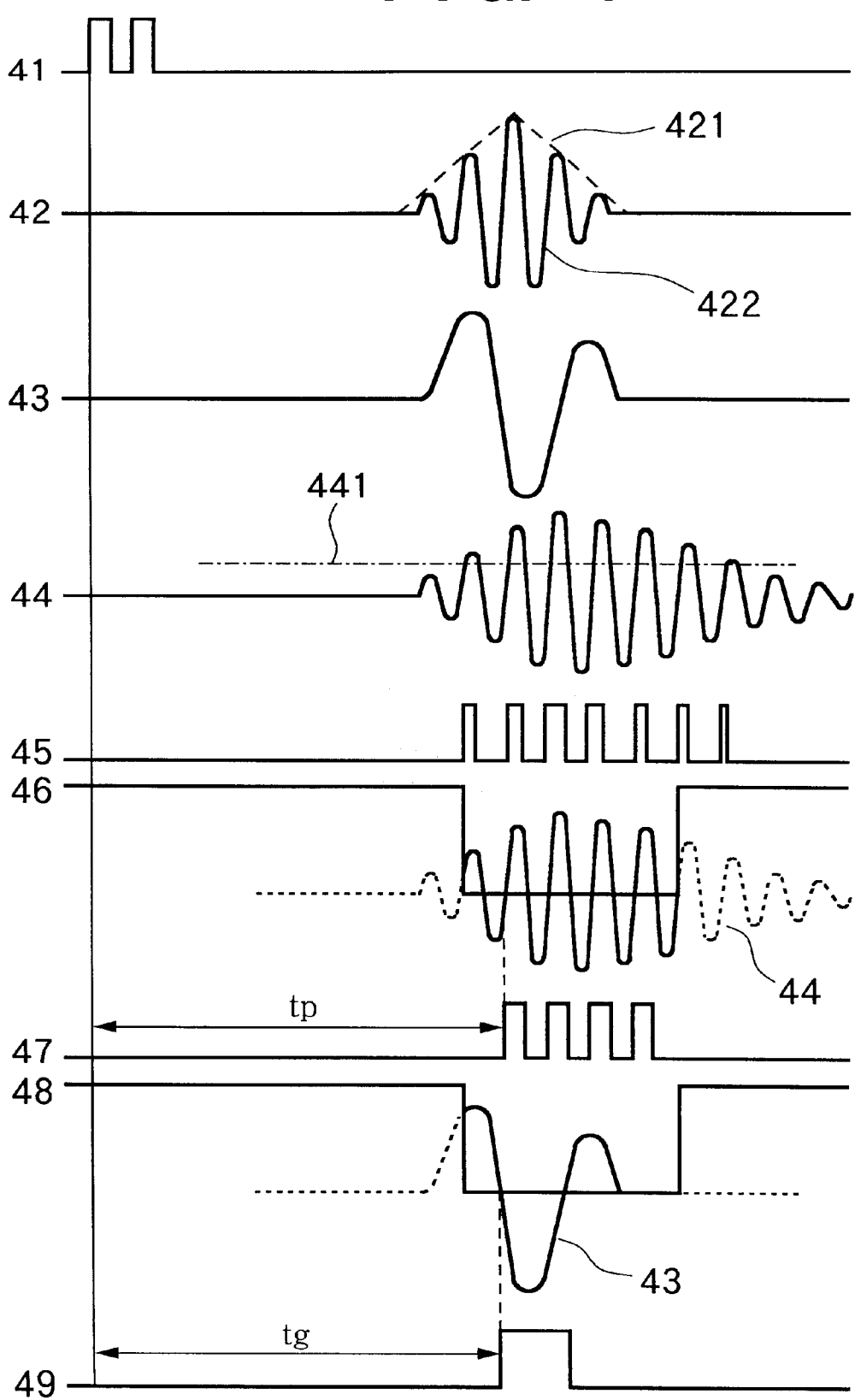
FIG. 4 is a timing chart useful in describing processing executed by the signal waveform sensing circuit of the first embodiment.

In FIG. 3, the arithmetic and control unit 1 first outputs a sensor select signal to a sensor selection circuit 31 to select the vibration sensor 6a, for example. Next, the arithmetic and control unit 1 outputs a pen driving signal (41 in FIG. 4) and starts an internal timer (constituted by a counter) to initiate timekeeping. Ultrasonic vibration transferred from the vibrating input pen 3 to the vibration transfer plate 8 is sensed by the vibration sensor 6a after traveling for the time tg, which conforms to the distance to the vibration sensor 6a. A signal 42 shown in FIG. 4 represents the signal waveform sensed by the vibration sensor 6a.

Since the vibration used in the first embodiment is composed of lamb waves, a velocity Vg at which the envelope 421 of the sensed waveform propagates and a velocity Vp at which the phase 422 propagates differ. Accordingly, the relationship between the envelope 421 and phase 422 of the sensed waveform varies in dependence upon propagation distance in the vibration transfer plate 8 during the transfer of vibration. The distance between the vibrating input pen 3 and the vibration sensor 6a can be sensed based upon these velocities Vg and Vp.

First, focusing solely upon the envelope 421, if a specific point on the waveform, e.g., an inflection point, or a peak such as a signal 43 is sensed, the distance between the vibrating input pen 3 and the vibration sensor 6a will be given by $$d = V_g \cdot t_g \tag{1}$$

where tg represents vibration transfer time. Let the time from a specific detection point of phase 422, e.g., from the moment at which vibration is applied, to the zero-cross point following a certain prescribed signal level 46 be represented by tp (47) [which is obtained by generating a window signal tw (44) with respect to a signal 45 and comparing this with the phase signal 44]. The distance between the vibration sensor 6a and the vibrating input pen 3 will then be given by $$d = n \cdot \lambda_p + V_p \cdot t_p \tag{2}$$

where λp represents the wavelength of the elastic waves and n is an integer.

From Equations (1) and (2), the integer n can be expressed as follows:

$$n = [(V_g \cdot t_g - V_p \cdot t_p)/\lambda p + 1/N] \tag{3}$$

Here N is a real number other than zero and any suitable value is used. By substituting the n thus found into Equation (2), the distance between the vibrating input pen 3 and vibration sensor 6a can be measured in highly precise fashion.

FIG. 3 is a block diagram showing the details of construction of the signal waveform sensing circuit according to the first embodiment.

The output signal of the vibration sensor 6a is amplified to a prescribed level by the preamplifier circuit 12a (FIG. 2). As shown in FIG. 3, the amplified signal is selected by a sensor selection circuit 31 and input to an absolute-value circuit 32 and bandpass filter 37. The signal applied to the absolute-value circuit 32 is input to an envelope detection circuit 33, which is constituted by a low-pass filter or the like, from which the envelope of the input signal is extracted. The extracted envelope signal enters a window signal generating circuit 35, which generates a detection window signal tw, a double-differentiation circuit 34 and a level adjustment circuit 3a for detecting level information. The double-differentiation circuit 34 provides a double-differentiated waveform signal (43 in FIG. 4) of the envelope signal. The double-differentiated waveform signal is compared with a gate signal (48 in FIG. 4) by a tg-signal sensing circuit 36 constituted by a vibration comparator, whereby tg (49 in FIG. 4) is formed. The signal representing tg enters a waveform shaping circuit 39.

The signal obtained from the bandpass filter 37 is input to the waveform shaping circuit 39 via a tp-signal sensing circuit 38, which is constituted by a comparator.

On the basis of the pen driving signal (41 in FIG. 4) and the detection window signal tw (44 in FIG. 4), the waveform shaping circuit 39 generates pulse signals having durations equivalent to the delay times tg, tp from driving of the vibrating input pen 3. These signals are output to the arithmetic and control unit 1. The arithmetic and control unit 1 measures the durations of the pulse signals and calculates distance in accordance with the calculation equation given above.

The signal applied to the level adjustment circuit 3a, even if it is of maximum size, is subjected to a level adjustment at an amplification factor set in such a manner that the input voltage range of an A/D converter 3c will not be exceeded. The level-adjusted signal enters a peak holding circuit 3b, which holds the peak level of the signal and applies this voltage to the A/D converter 3c. The arithmetic and control unit 1 monitors the tg-signal sensing circuit 36 and starts loading the level-adjusted signal into the A/D converter 3c after a fixed delay from the timing at which tg was sensed.

The timing at which the loading of the signal into the A/D converter 3c is started will be described with reference to FIG. 5.

Figure 5:
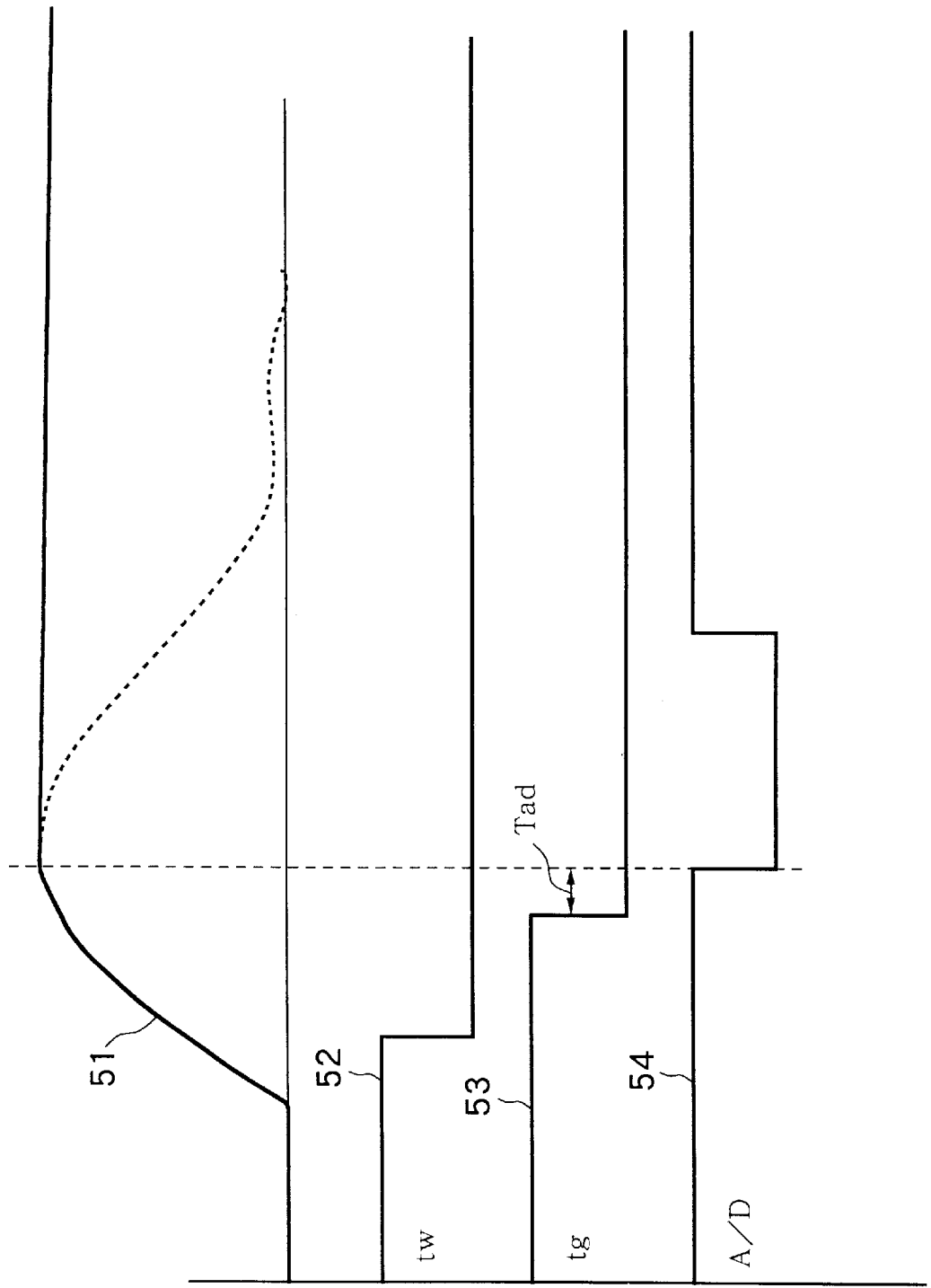
FIG. 5 is a diagram useful in describing the timing at which an A/D converter starts capturing data in the first embodiment.
Figure 6:
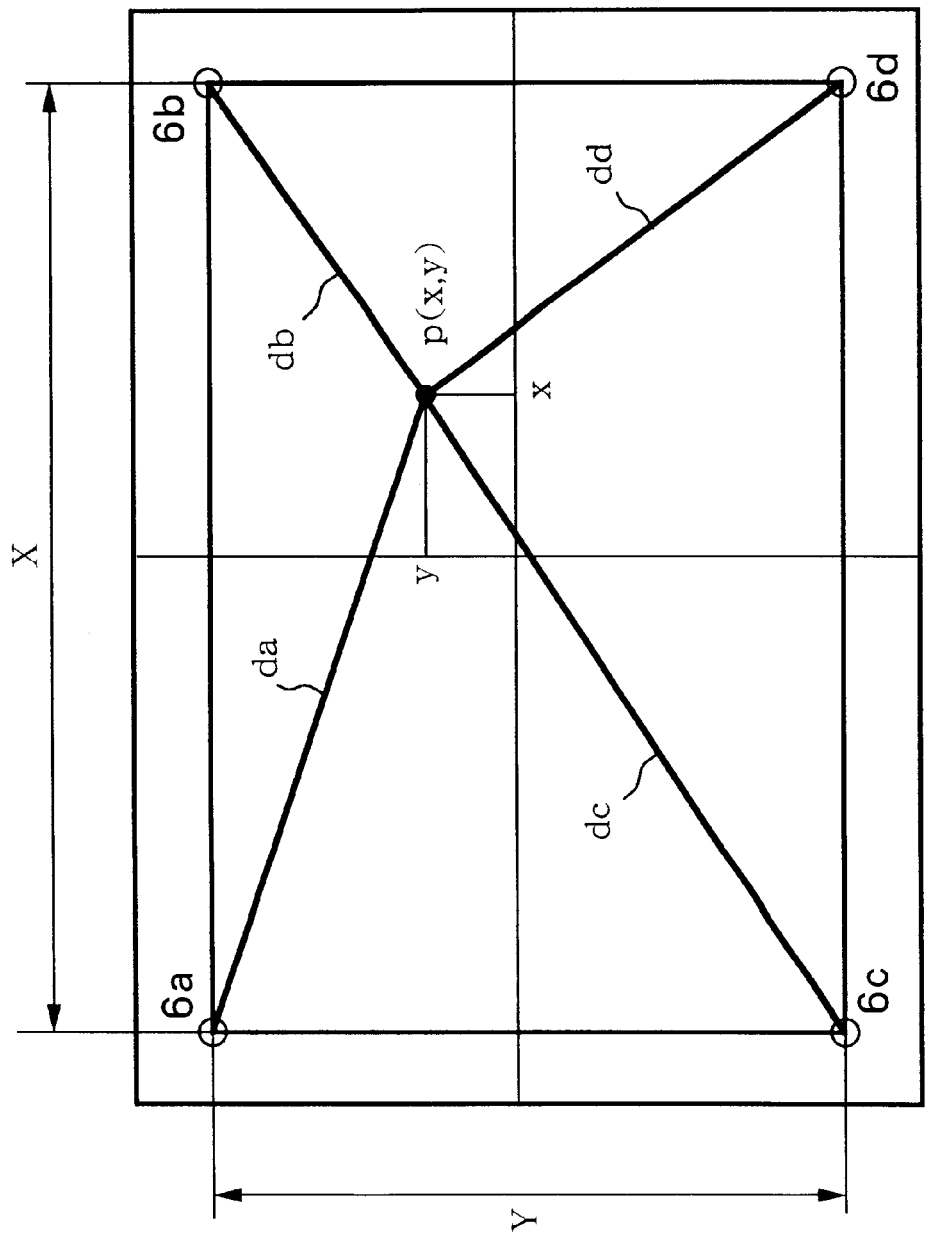
FIG. 6 is a diagram useful in describing a procedure through which the coordinate input apparatus of the first embodiment calculates coordinates.

FIG. 5 is a diagram useful in describing the timing at which an A/D converter starts capturing data in the first embodiment.

As shown in FIG. 5, tg, which is obtained by performing differentiation twice, is sensed at the timing of an inflection point with respect to an output signal 51 of the peak holding circuit 3b. The arithmetic and control unit 1 sends a command for initiating sampling 54 to the A/D converter 3c based upon a delay time Tad, at which sensing is performed substantially in the vicinity of the peak, from tg. The signal 51 is output while held substantially at its peak level by the peak holding circuit 3b during the sampling time of the A/D converter 3c. The time constant of the peak holding circuit 3b is set in such a manner that the level will not be attenuated below the minimum detection level by the time the next detection is performed. The signal level obtained by the sampling 54 is converted from an analog to a digital quantity by the A/D converter 3c and the resulting signal is input to the arithmetic and control unit 1 as the detected level signal.

The above-described operation is performed in regard to the other vibration sensors 6b to 6d as well to sense distances da to dd from the vibrating input pen 3 to the vibration sensors 6a to 6d, respectively.

On the basis of the distances da to dd sensed, coordinates (x,y) of a position P of the vibrating input pen 3 can be obtained from the Pythagorean theorem in accordance with the following equations:

$$x = (da + db) \cdot (da - db)/2X \tag{4a}$$

or $$x = (dc + dd) \cdot (dc - dd)/2X \tag{4b}$$

$$y = (da + dc) \cdot (da - dc)/2Y \tag{5a}$$

or $$y = (db + db) \cdot (db - dd)/2Y \tag{5b}$$

where X, Y represent the distances between the sensors 6a, 6b (6c, 6d) and between the sensors 6a, 6c (6b, 6d) respectively.

The simultaneously sensed signal levels contain attenuation due to the effects of the distances da to dd. If these signal levels are output as they are as pen pressure information, the values will differ, even though the pen pressure is the same, owing to the distances from the vibration sensors 6a–6d to the vibrating input pen 3. Accordingly, a correction of attenuation due to distance is performed based upon the distances da–dd from the vibration sensors 6a–6d to the vibrating input pen 3.

Figure 1:
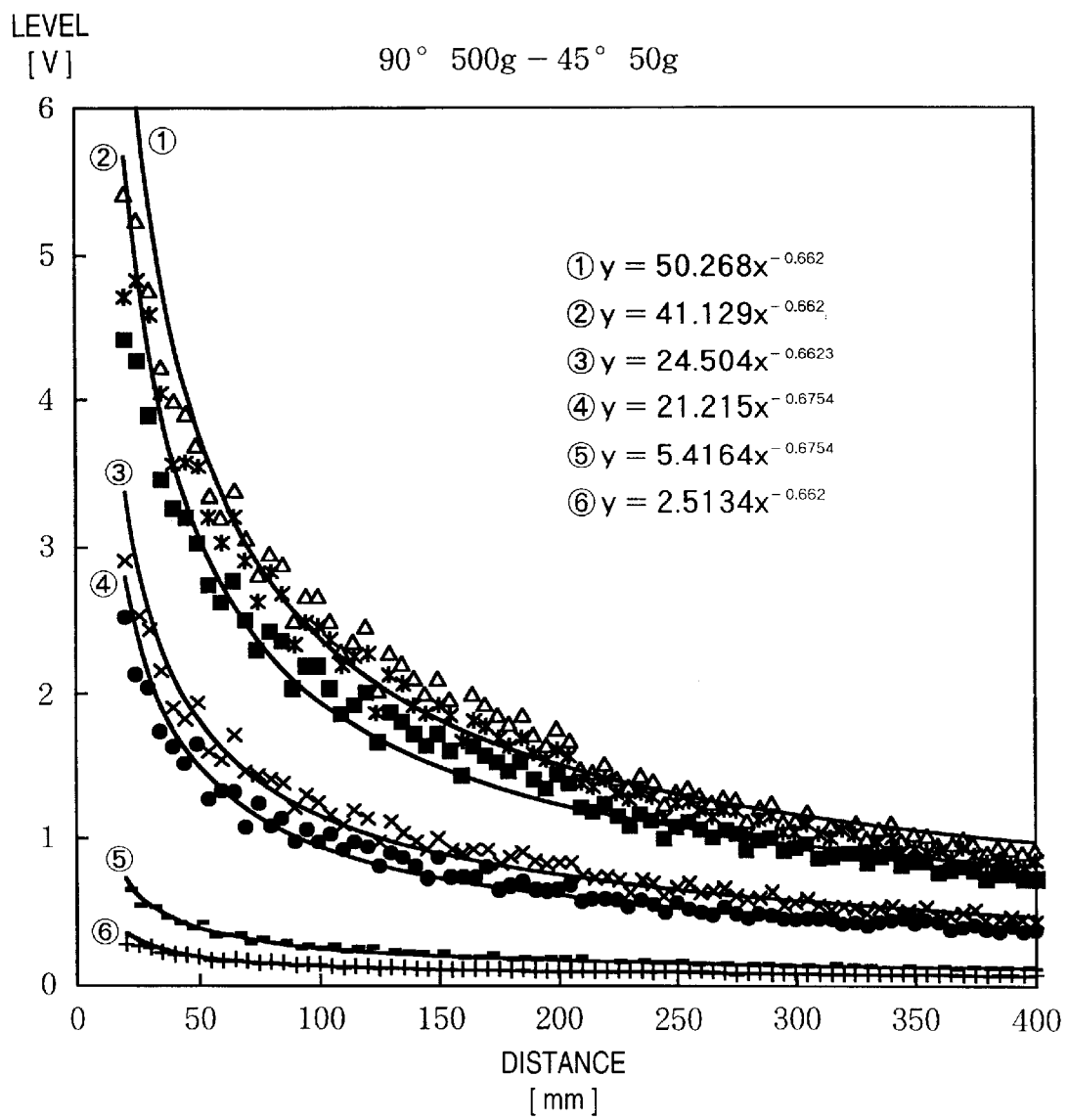
FIG. 1 is a graph showing distance between a vibration sensor and a vibrating input pen as well as the relationship between sensed signal level and the distance between the vibration sensor and vibrating input pen under input conditions in which the pen pressure and input angle of the vibrating input pen differ.

FIG. 1 shows the result of measuring the distance between the vibration sensor 6a and the vibrating input pen 3 as well as the relationship between sensed signal level and the distance between the vibration sensor 6a and vibrating input pen 3 under input conditions in which the pen pressure and input angle of the vibrating input pen 3. In particular, FIG. 1 shows attenuation curves of signal level versus distance under various input conditions of input angle and pen pressure ranging from 90° 500 g to 45° 50 g (S0 mode attenuation level when the following hold: ① 90° 500 g; ② 90° 300 g; ③ 60° 500 g; ④ 60° 300 g; ⑤ 45° 500 g; ⑥ 45° 300 g). If these attenuation curves are approximated by an exponential equation, we have the following approximation curve:

$$V' = V \cdot d^{-2/3} \tag{6}$$

where V' represents the sensed signal level (which takes distance into account), V the level information and d the distance.

By dividing the sensed signal levels by the distances da to dd raised to the $-2/3$ power, in accordance with Equation (6), it is possible to calculate level information that is not influenced by distance.

The above-mentioned approximation curve may be one that is optimized by the specifications of the coordinate input apparatus. Further, in a case where it is difficult to perform the above-described calculation by actual real-time processing, an arrangement may be adopted in which a table of values obtained by raising the distances da to dd to the −⅔ power is created in advance and level information is calculated by multiplying these values by the sensed signal levels. Further, an arrangement may be adopted in which data is taken at several points on an attenuation curve, as shown in FIG. 1, and use is made of values obtained by applying linear interpolation between adjacent points.

The calculated level information contains pen pressure information and information relating to the slope of the attenuation curve. In actual use, the practice is to apply relative control for each single stroke to adjust line thickness due to pen pressure applied by the user employing the vibrating input pen 3. Further, since a change in the slope of the attenuation curve in one stroke is not very great, using this level information as the pen pressure information does not provide results that seem abnormal. On the contrary, in view of the fact that line thickness or density varies depending upon the slope of the attenuation curve even with an ordinary writing instrument, a sensation closer to that of an ordinary writing instrument is obtained.

For example, by calculating level information for each of the vibration sensors 6a to 6d and outputting the average value of these items of information to the host device as pen pressure information along with the coordinate information, an operation more closely approximating the manipulation of an actual writing instrument becomes possible.

Naturally, calculation of the level information may be performed for all of the vibration sensors 6a to 6d or may be performed for certain specific vibration sensors.

In accordance with the first embodiment, as described above, signal level can be sensed upon eliminating the influence of a fluctuation in level caused by the distance between a vibration sensor and a vibration input pen. This makes it possible to calculate accurate pen pressure from the signal level. As a result, it is possible to provide a coordinate input apparatus that feels more natural to use without requiring a special arrangement exclusively for sensing pressure information.

Second Embodiment

In the first embodiment, level information that has been calculated may be used in the form of the value per se. However, the bit width of the value may be altered in conformity with the specifications of the coordinate input apparatus.

For example, in a coordinate input apparatus in which signal levels are sensed when the vibrating input pen 3 is driven at different driving levels, naturally there is a difference in accordance with the ratio of the driving levels even though the signal levels are the same.

In calculation of level information in a case where dynamic range is assured by applying an input that exceeds the dynamic range and driving the input pen upon lowering the driving level by 6 db, means is provided for storing the distance between each vibration sensor and the vibrating input pen as well as driving level used when sensing the signal level. Then, in performing calculation of level information from which the influence of distance has been eliminated in the manner set forth above, the calculation is carried out by multiplying the level information by the ratio of the driving levels. For example, in a case where the ratio of the driving levels is 6 db, the calculation of level information is performed by approximately doubling the sensed signal level.

By adopting this expedient, the bit width of the calculated level information will differ from that possessed by the coordinate input apparatus and it will suffice, therefore, to correct this difference. For example, in case of the bit width of pen pressure information for outputting 256 levels, it will suffice to apply a correction by deciding correction coefficients in such a manner that the maximum value will converge to this bit width.

Third Embodiment

In the first embodiment, level information is utilized as pen pressure information. However, level information may be put to other uses as well.

For example, since the level information is devoid of the effects of distance, the signal level levels associated with a plurality of vibration sensors are regarded as being identical. Accordingly, items of level information calculated by a plurality of vibration sensors can be compared and can be used to monitor a variance in the sensor levels of the vibration sensors based upon the results of the comparison. For example, the level information can be used as criteria for alerting the user. Specifically, in a case where the level calculated from one vibration sensor is much lower than the levels calculated from the other vibration sensors, this can be construed as indicating the occurrence of a failure and the user can be so notified.

Further, an input is made by the vibrating input pen under a certain pen pressure in an initial state, a variance in the level information calculated from each of the vibration sensors at such time is measured, coefficients for correcting for this variance are calculated and these coefficients are stored. Then, if the obtained level information is corrected employing these correction coefficients when the apparatus is used subsequently, similar level information will be calculated from all of the vibration sensors.

Further, a key feature of a coordinate input apparatus using lamb waves is that calculation of coordinates is not influenced when the user's hand touches the coordinate input apparatus. However, vibration is attenuated if the user's hand touches the vibration propagation path with great pressure. A change in the level information owing to such attenuation can be sensed by monitoring the level information corrected in the manner described above. In such case, more accurate pen pressure information can be output by arranging it so that use is not made of a vibration sensor for which the level that is calculated is smaller than the levels calculated in regard to the other vibration sensors. If calculation of coordinates is performed without using level information calculated from this vibration sensor, it is possible to prevent a decline in calculation precision.

Fourth Embodiment

In the first embodiment, the description relates to a coordinate input apparatus in which the arithmetic and control unit 1 and the vibrating input pen 3 are connected by a cord and use is made of the elastic waves of vibration input from the vibrating input pen 3. However, the present invention can be used effectively also in a coordinate input apparatus having a cordless-type vibration input pen disclosed in the specifications of Japanese Patent Application Laid-Open Nos. 63-126025 and 6-67794, etc.

When a cordless vibration input pen is used, level information can be utilized not only as pen pressure information but also for sensing the amount of remaining power capacity in an internal driving power source. For example, in a case where an input is made at a constant pen pressure and the level information at such time is lower than a prescribed level, this can be construed as indicating an inadequate source of driving power and the user can be alerted to replace the power source. Further, in a case where it is difficult to achieve input at constant pen pressure, maximum level for the period of time that the power source is ON can be stored in advance. If this value falls below a difference set in advance, it is judged that the source of driving power is inadequate and the user can be alerted to replace the power source.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for calculating a position, which has been designated by a vibrating input pen, based upon vibration that has been input to a vibration transfer plate by the vibrating input pen, comprising:

sensing means for sensing the vibration as a signal;

measurement means for measuring a signal level of the signal sensed by said sensing means;

distance calculation means for calculating a distance between said sensing means and a position input by the vibrating input pen; and calculation means for correcting an influence on the signal level caused by the distance and calculating input-level information of a vibration of the vibrating input pen, on the basis of the distance and the signal level measured by said measurement means.

2. The apparatus according to claim 1, wherein said calculation means outputs the input-level information as pen pressure information of the vibrating input pen.

3. The apparatus according to claim 1, wherein said calculation means calculates the input-level information by dividing the signal level, which has been measured by said measurement means, by the distance raised to the $-\frac{2}{3}$ power.

4. The apparatus according to claim 1, wherein said calculation means outputs the input-level information as detection information indicating detection of failure of said sensing means.

5. The apparatus according to claim 1, wherein in a case where a driving power source is incorporated within said vibrating input pen, said calculation means outputs the input-level information as residual power source information indicating amount of power remaining in said driving power source.

6. A method of controlling a coordinate input apparatus for calculating a position, which has been designated by a vibrating input pen, based upon vibration that has been input to the vibration transfer plate by the vibrating input pen, comprising:

a sensing step of sensing the vibration as a signal by a sensing unit;

a measurement step of measuring signal level of the signal sensed at said sensing step;

distance calculation step for calculating distance between said sensing step and a position input by the vibrating input pen; and calculation step for correcting an influence on the signal level caused by the distance and calculating input-level information of vibration of the vibrating input pen, on the basis of the distance and the signal level measured by said measurement step.

7. The method according to claim 6, wherein said calculation step outputs the input-level information as pen pressure information of the vibrating input pen.

8. The method according to claim 6, wherein said calculation step calculates the input-level information by dividing the signal level, which has been measured at said measurement step, by the distance raised to the $-\frac{2}{3}$ power.

9. The method according to claim 6, wherein said calculation step outputs the input-level information as detection information indicating detection of failure of the sensing unit.

10. The method according to claim 6, wherein in a case where a driving power source is incorporated within said vibrating input pen, said calculation step outputs the input-level information as residual power source information indicating amount of power remaining in said driving power source.

11. A computer-readable memory storing program code which controls a coordinate input apparatus for calculating a position, which has been designated by a vibrating input pen, based upon vibration that has been input to a vibration transfer plate by the vibrating input ;en, the program code comprising:

program code of a sensing step of sensing the vibration as a signal by a sensing unit;

program code of a measurement step of measuring signal level of the signal sensed at the sensing step;

program code of a distance calculation step for calculating distance between said sensing step and a position input by the vibrating input pen; and program code of a calculation step for correcting an influence on the signal level caused by the distance and calculating input-level information of vibration of the vibrating input pen, on the basis of the distance and the signal level measured by said measurement step.

* * * * *

UNITED STATES PATENT AND TRADEMARK OFFICE
CERTIFICATE OF CORRECTION

PATENT NO. : 6,288,711 B1
DATED : September 11, 2001
INVENTOR(S) : Atsushi Tanaka et al.

It is certified that error appears in the above-identified patent and that said Letters Patent is hereby corrected as shown below:

Column 4,
Line 12, "times" should read -- times are --.

Column 10,
Line 11, "amount" should read -- an amount --;
Line 22, "distance" (first occurrence) should read -- a distance --;
Line 25, "calculation" should read -- a calculation --;
Line 39, "the" should read -- said --;
Line 40, "unit." should read -- means. --;
Line 45, "amount" should read -- an amount --;
Line 51, ";en," should read -- pen, --; and
Line 55, "times" should read -- times are --.

Signed and Sealed this

Second Day of April, 2002

Attest:

JAMES E. ROGAN
Attesting Officer     Director of the United States Patent and Trademark Office